(12) United States Patent
Patel

(10) Patent No.: US 6,802,218 B2
(45) Date of Patent: Oct. 12, 2004

(54) FLEXIBLE LEVEL DETECTION APPARATUS

(75) Inventor: Krupal Patel, Canton, MI (US)

(73) Assignee: Ametek, Inc., Paoli, PA (US)

( * ) Notice: Subject to any disclaimer, the term of this patent is extended or adjusted under 35 U.S.C. 154(b) by 0 days.

(21) Appl. No.: 10/237,120

(22) Filed: Sep. 9, 2002

(65) Prior Publication Data

US 2004/0045353 A1 Mar. 11, 2004

(51) Int. Cl.[7] ............................................. G01F 23/00
(52) U.S. Cl. ............... 73/290 V; 73/290 R; 324/207.13
(58) Field of Search .................... 73/290 V, 290 R; 324/207.13

(56) References Cited

U.S. PATENT DOCUMENTS

| | | | | |
|---|---|---|---|---|
| 4,939,457 A | * | 7/1990 | Tellerman | 324/207.13 |
| 5,076,100 A | * | 12/1991 | Hunter et al. | 73/290 V |
| 5,929,763 A | * | 7/1999 | Koski | 340/618 |
| 5,986,449 A | | 11/1999 | Koski | 324/207.13 |
| 5,998,991 A | * | 12/1999 | Begin | 324/207.13 |
| 6,356,071 B1 | * | 3/2002 | Koski et al. | 324/207.13 |
| 6,601,000 B1 | * | 7/2003 | Barlian et al. | 702/55 |

* cited by examiner

Primary Examiner—Hezron Williams
Assistant Examiner—Rodney Frank
(74) Attorney, Agent, or Firm—Young & Basile, P.C.

(57) ABSTRACT

A level detection apparatus includes a wave guide or discrete sensors mounted in an outer flexible housing. A weight is attached to a distal end of the outer housing. A biasing spring is coupled to the opposite end of the outer housing for exerting a force on the outer housing to accommodate thermal expansion and contraction of the outer housing to maintain the weight in close proximity to the bottom surface of an enclosure in which the apparatus is mounted.

38 Claims, 8 Drawing Sheets

FLEXIBLE LEVEL DETECTION APPARATUS

BACKGROUND

The present invention relates, in general, to level detection apparatus.

Liquid level detection apparatus utilizing wave guides are widely employed in diverse applications to measure the level of a liquid or solid fluent material in enclosures, such as tanks. Such wave guide-based level detection apparatus operate on the principal of signal reflection caused by disparities between the top surface of the liquid or solid fluent material in the tank and the different liquid gas located above the top surface. Such wave guide-based apparatus can operate on radar and laser principles to reflect a signal off of the top surface of the material in a tank to determine the level of the material in the tank.

The phenomenon of magnetostriction has been widely employed in linear distance and position measuring devices. A magnet located near or around a magnetostrictive wire marks the location to be measured. Such devices can operate with either mechanical or electrical excitation. When an acoustical/mechanical strain propagating along the wire reaches the area of influence of the magnet, an electrical signal is generated in the wire. Conversely, when an electrical signal propagating along the wire reaches the area of influence of the magnet, a torsional strain is generated in the wire.

Such linear position detectors using a magnet mounted in a float have been utilized as liquid level detectors to provide an indication of a level of liquid within a tank, such as an underground tank. The position of the magnet, and hence, the liquid level, is determined as a function of time required for a torsional disturbance to propagate from one end of the wire through the area of influence of the magnet in the case of mechanical excitation, or from the position of the magnet to a sensing apparatus located at one end of the wire in the case of electrical excitation.

Other types of magnetostrictive position measuring devices utilize a reflective termination at the foot end of the magnetostrictive wire. Such devices measure the difference between the propagation times of a pulse from the magnet position to the foot of the wire and reflected back to the head of the device and a pulse traveling on the wire directly from the magnet to the head.

As shown in U.S. Pat. Nos. 4,839,590; 5,017,867; 5,050,430; and 5,253,521, all of which are assigned to the assignee of the present invention, such magnetostrictive devices include an elongated, small diameter tube, typically made of stainless steel, on which a movable magnet is mounted for providing an indication of a liquid level. A head and cap are mounted on one end of the tube, typically above the liquid level, and enclose electronic components, such as terminal connections and a signal conditioning circuit used to supply or output signals to and from the magnetostrictive wire in the tube.

Some liquid level detection applications require probe lengths of more than 20 feet. Since such probes are typically constructed of a rigid brass or stainless steel tube, the length of the tube creates significant problems with respect to storage, shipping and installation of the probes. The long, straight probes make it difficult to install the probe in confined areas lacking sufficient clearance above the tank for insertion of the probe through a port in the tank. Additional problems are encountered when installing such long length probes in large above-ground tanks. Such tanks require the installer to carry the probe up a ladder on the exterior of the tank and then to insert the long probe through an opening in the top of the tank.

It is known to construct liquid level detection apparatus or probes with a flexible housing in the form of a magnetostrictive wire mounted within a flexible, plastic outer tube. However, the use of a flexible outer plastic tube does not meet the requirement of non-permeability to fluids. The use of plastic outer housings has resulted in the ingress of toxic, corrosive, and/or explosive fluids into the interior of the housing which interfere with the timed propagation of signals along the magnetostrictive wire.

The Assignee of the present invention previously devised a material level detection apparatus having a flexible outer housing as described in U.S. Pat. No. 5,929,763. The outer tube is formed of a semi-rigid flexible material which is non-permeable to the material in a tank, for example, yet is flexible enough to permit coiling to simplify installation, particularly in longer length level detection apparatus approaching fifty feet or more.

Figure 1:
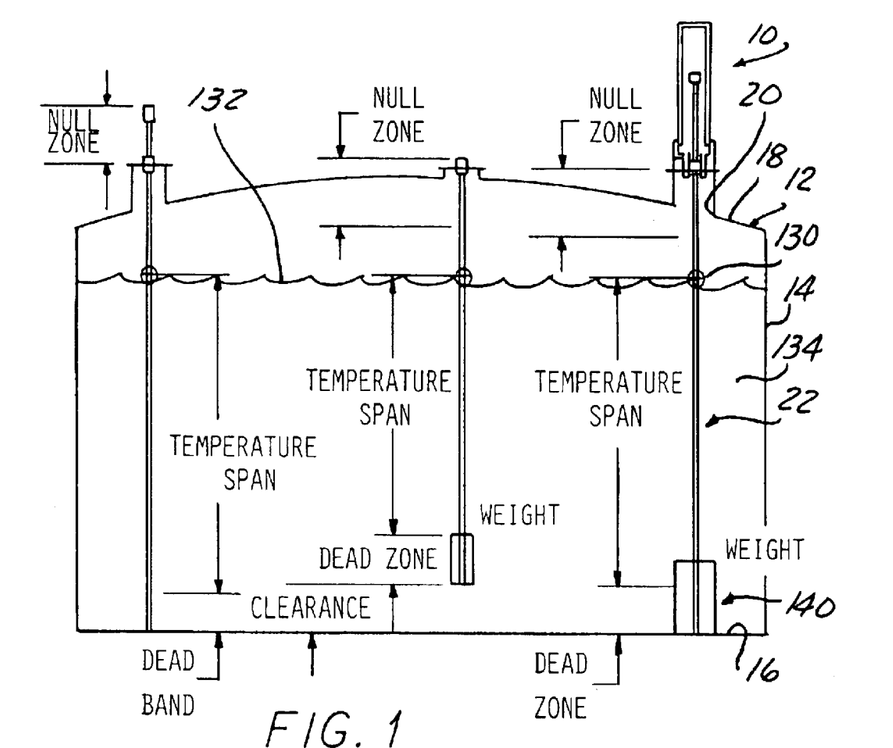
FIG. 1 is a pictorial representation of the present level detection apparatus mounted in a tank along with two different prior art level detector apparatus.

In order to maintain the flexible outer housing in as straight as possible a position in a tank for accurate level measurements, a weight was attached to the distal end of the outer housing as shown for the center level detection apparatus in FIG. 1. However, it was known that the typically plastic material used to form the outer housing has a significant coefficient of thermal expansion which can cause the overall length of the outer housing to vary many inches relative to the inner housing containing the magnetostrictive wire which is typically housed in a metal, such as a brass housing, inside of the outer, plastic housing. Due to the possibility of significant extension of the outer housing, the distal end of the outer housing had to be spaced a significant difference from the bottom of the tank to prevent contact with the tank which could lead to inaccurate level detection measurements due to bowing of the outer housing and the inner housing containing the magnetostrictive wire during extreme thermal expansion conditions.

Thermal expansion is not a major consideration for rigid magnetostrictive-based wave guide level detectors, as shown by the left most level detector in FIG. 1. However, since the bottom end of the rigid housing needs to be placed in contact with the bottom of the tank, accurate and somewhat costly tank height measurement must be taken in the field in the case of retrofit applications.

While the rigid housing application shown on the left in FIG. 1 places the bottom end of the wave guide or magnetostrictive wire extremely close to the bottom of the tank so as to provide a minimal dead zone or non-measurement zone at the bottom of the tank, such is not the case for the flexible outer housing shown in the center application in FIG. 1. As described above, due to the need to maintain the distal end of the flexible plastic outer housing and weight above the bottom of the tank at extreme thermal expansion conditions, the dead zone or non-measurement height in the bottom of the tank is increased from the rigid housing described above.

It would be desirable to provide a wave guide-based level detection apparatus which utilizes a flexible outer housing for ease of installation and at the same time has a minimal dead zone or non-measurement area in the bottom of the tank for a greater measurement range. It would also be desirable to provide such a wave guide-based level detection apparatus which can minimize the dead zone band of non-measurement in the bottom of the tank while simplifying wave guide installation by eliminating the need to accurately know or determine the inside height dimension of the tank.

SUMMARY

The present invention is a level detection apparatus for detecting the surface level of material in an enclosure, such as a tank or reservoir.

In one aspect, the level detection apparatus includes a wave guide means having first and second opposed ends. A biasing means is fixed on an enclosure and exerts a biasing force on the wave guide means to accommodate thermal expansion. A weight is attached to the second end of the wave guide means for fixing the second end of the wave guide means on the bottom of the enclosure.

In another aspect, an outer flexible housing has first and second ends. The second end of an inner housing is fixed to the outer housing. A biasing means is coupled to the first end of the outer housing for exerting a biasing force on the housing to accommodate thermal expansion movement of the outer housing. Means are provided for fixedly mounting the biasing means relative to an enclosure. A weight is coupled to the second end of the outer tube to maintain the second end of the outer tube in close proximity to or directly on a bottom surface of the enclosure.

In one aspect, a sensor means is mounted to an inner housing having first and second opposed ends and an outer housing having first and second ends. The second end of the inner housing is fixed to the outer housing. Biasing means are coupled to the first end of the outer housing for exerting a biasing force on the outer housing to accommodate thermal expansion movement of the outer housing. Means are provided for fixedly mounting the biasing means. A weight is coupled to the second end of the outer tube.

In one aspect, the biasing means is a constant force spring having an end extending from a coil portion, the end attached to the outer housing.

In one exemplary use of the level detection apparatus of the present invention, the wave guide includes a magnetostrictive wire extending through the inner housing. The transducer means includes means for imparting a signal to the wire and for receiving a return signal propagated along the wire. The transducer means is preferably mounted on a circuit board fixed in position within the outer housing.

The support means in one aspect of the invention includes a coupling mountable on an enclosure cover and having a through bore for receiving a first end of the outer tube therethrough. A plurality of support rods are mounted in the coupling and extend outward from the coupling. Mounting means are provided for receiving opposite ends of the support rods. The mounting means carry a coiled portion of the biasing means. In a detailed aspect, the mounting means includes first and second bodies rotatably coupled to each other. The first body receives one end of the support rods, and the second body supports the biasing means.

The flexible level detection apparatus of the present invention provides numerous advantages in level detection apparatus, particularly detecting the top or surface level of material in a tank or enclosure. The apparatus employs a flexible housing which simplifies transportation to the installation site and actual installation of a wave guide in the housing in tank since the housing may be coiled prior to insertion into the tank. At the same time, the present apparatus accommodates thermal expansion and contraction of the flexible outer housing thereby creating a minimal dead zone near the bottom of the tank for accurate level measurements despite the varying position of the second end of the wave guide.

BRIEF DESCRIPTION OF THE DRAWING

The various features, advantages and other uses of the present invention will become more apparent by referring to the following detailed description and drawing in which.

DETAILED DESCRIPTION

Referring now to the drawing, and to FIGS. 1–14 in particular, there is depicted a material level detection apparatus 10 constructed in accordance with the teachings of the present invention and advantageously suited for measuring material levels in a tank, reservoir, or other enclosure 12. As shown in FIG. 1, by example only, the tank 12 is typically formed with a continuous sidewall 14 which extends between a bottom surface 16 and a top surface or cover 18. An aperture 20 is formed in the top cover 18 for mounting the level detection apparatus 10 thereto, as described hereafter.

According to the present invention, the apparatus 10 includes a wave guide means or assembly formed of an outer tube structure denoted by reference number 22 and an inner mounted sensor assembly denoted generally by reference number 24 which includes an inner tube or housing 26. The outer tube structure 22 includes a main or first outer tube 28 of generally constant diameter between a first end 30, shown in FIG. 5 and an opposed second end 32 shown in FIG. 7. An end plug assembly 34 mounted to the second end 32 of the outer tube 28 sealingly closes the opening in the second end 32.

Figure 3:
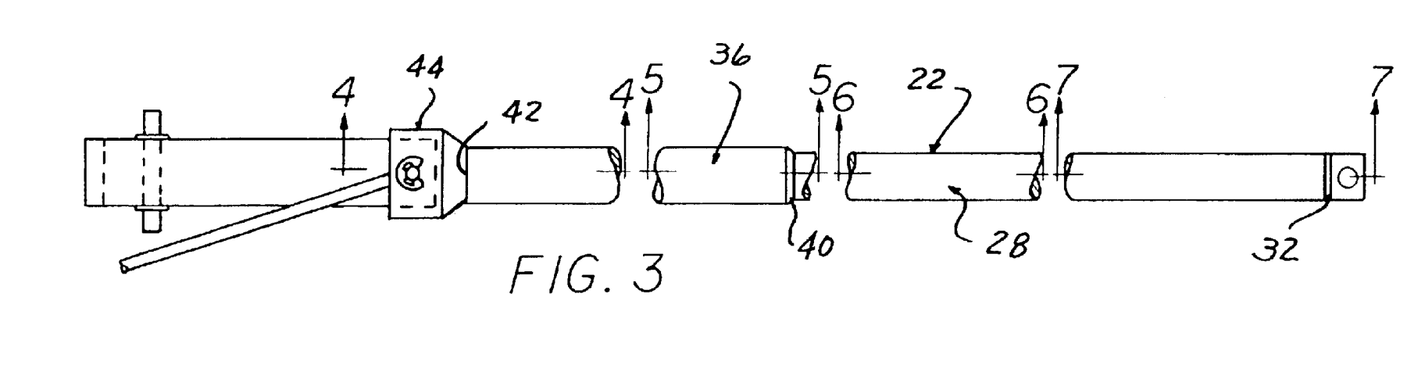
FIG. 3 is a broken, side elevational view of the wave guide portion of the level detection apparatus of the present invention.
Figure 4:
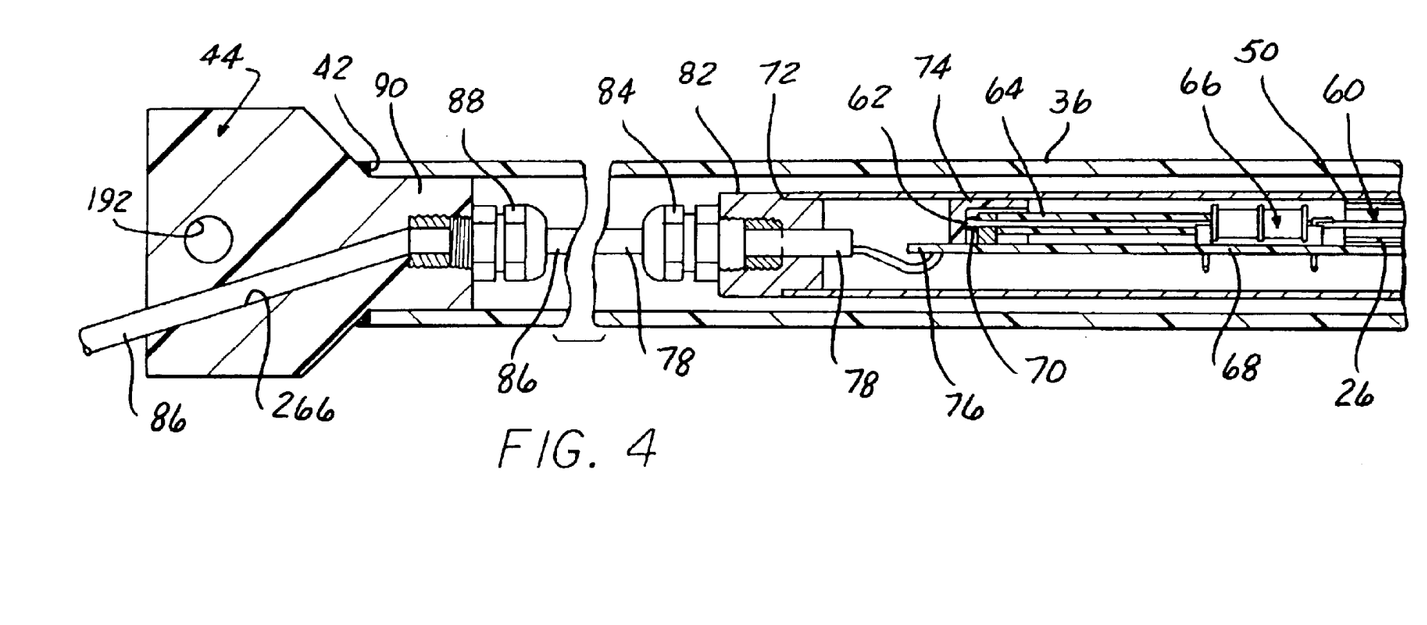
FIG. 4 is a cross-sectional view generally taken along line 4—4 in FIG. 3.
Figure 5:
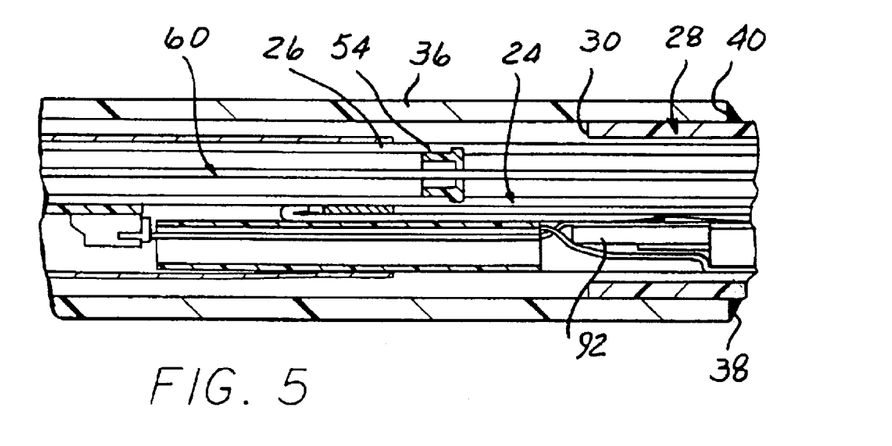
FIG. 5 is a cross-sectional view generally taken along line 5—5 in FIG. 3.

As shown in FIGS. 3, 4 and 5, the first end 30 of the main outer housing 28 is inserted into a larger diameter upper outer tube 36 and is sealingly and fixedly joined thereto by suitable means, such as by a press fit, or by heat or sonic welds 38 between one end 40 of the upper outer tube 36 and an adjacent outer surface of the main tube 28 as shown in FIG. 5. The opposite end 42 of the upper outer tube 36 is fixedly and sealingly joined to a collar 44. Further details concerning the construction of the collar 44 will be described hereafter.

The main outer housing 28, the upper outer tube 36 and the collar 44 are formed of a suitable material selected for use in the particular level detection application in which the apparatus 10 is to be employed. For applications which require non-permeable material for the outer housing 28, a vinylidene fluoride material sold commercially under the trademark "KYNAR" may be advantageously employed for the main outer housing 28. The wall thickness of the main outer tube 28 depends on the application. The main outer tube 28 may be formed of other semi-rigid or flexible materials, such as an ethylene, or tetrafluoroethylene sold commercially under the trademark "TEFLON". Other polyetheylenes or polypropylenes may also be used for the main outer tube 28. The upper outer tube 36 is preferably formed of a compatible material, but either with an increased wall thickness or greater density than the material used to form the main outer tube 28 so as to be substantially non-bendable between its opposed ends 40 and 42. The collar 44 is likewise formed of a material compatible to the upper outer tube 36 for welding compatibility.

Referring now to FIGS. 3–7, the inner tube 26 in a magnetostrictive-based level detection application using the apparatus 10 is formed of a non-magnetic material so as to be magnetically transmissive. Brass, stainless steel and even rigid plastic may be employed to form the inner tube 26. The inner tube 26 has a first end 50 shown in FIG. 4 and an opposed second end 52 shown in FIG. 7. The inner tube 26 is hollow and has a substantially constant cross-section between the first and second ends 50 and 52.

A plurality of non-magnetic spacers 54, formed of plastic, brass, etc., are fixedly mounted at spaced locations within the inner tube 26 between the first and second ends 50 and 52. The spacers 54 which have a generally annular shape, support a wave guide 60 which, in an exemplary application according to the present invention, is a magnetostrictive wire, also shown by reference number 60. The magnetostrictive wire 60 is preferably formed of a nickle-iron alloy. A material known as Ni-Span-C is suitable for use as the magnetostrictive wire 60.

The wire or wave guide 60 has a first end 62 which extends outward through the first end 50 of the inner tube 26 to a wire post 70 which is mounted on a rigid printed circuit board 68. An inner rubber damper member 64 surrounds the wire 60 between the post 70 and the sensing coil 66.

Alternately, a different pickup or transducer may be employed in place of the sensing coil assembly 66. For example, a piezoelectric crystal may be clamped to one end of the wire 60. The piezoelectric crystal operates as a transducer such that a localized strain propagating along the wire 60 causes the crystal to expand in one direction inducing a voltage in the crystal.

When the sensing coil 66 is employed as the pickup or transducer, the coil 66 is mounted on the printed circuit board 68 and concentrically surrounds the wire 60. One or more conductors extend from the coil 66. An outer tube 72 formed of brass surrounds the printed circuit board 68. In addition, a printed circuit board support 74 is fixed within the outer tube 72 on the wire post 70 for supporting the printed circuit board 68 in a fixed position within the outer tube 72.

One end 76 of the printed circuit board 68 receives individual conductors of a cable 78 which extends through a brass feed collar 82. A strain relief fitting 84 is threadingly attached to the feed collar 82 and supports the flexible cable 78 carrying the conductors from the printed circuit board 68 externally of the outer tube 72. A second strain relief 88 supports the cable 86 on first end 90 of the collar 44. The strain relief 88 is threadingly attached to the first end 90 of the collar 44.

Figure 6:
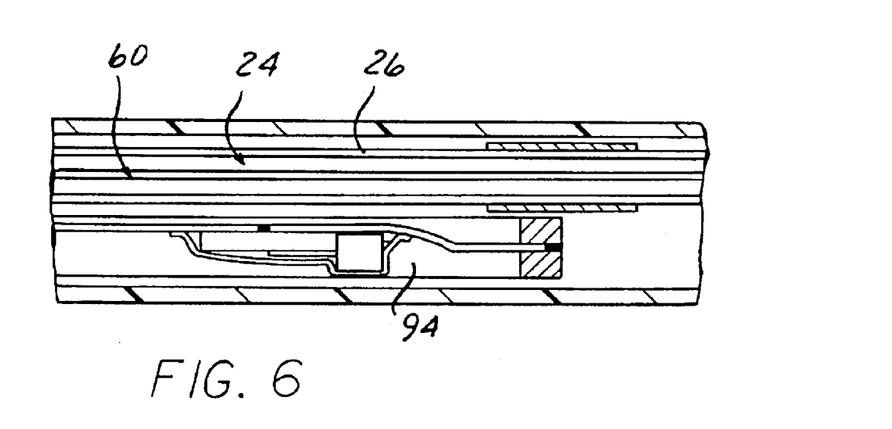
FIG. 6 is a cross-sectional view generally taken along line 6—6 in FIG. 3.

Employed by example only in the level detection apparatus 10 of the present invention are at least one or more temperature sensors 92 and 94 shown in FIGS. 5 and 6. Conductors from the temperature 92 and 94 can be connected to terminals on the printed circuit board 68. The temperature sensors 92, 94 are mounted in a short length tube which is fixed relative to the outer tube 72 and the inner tube 26 by a collar.

Figure 7:
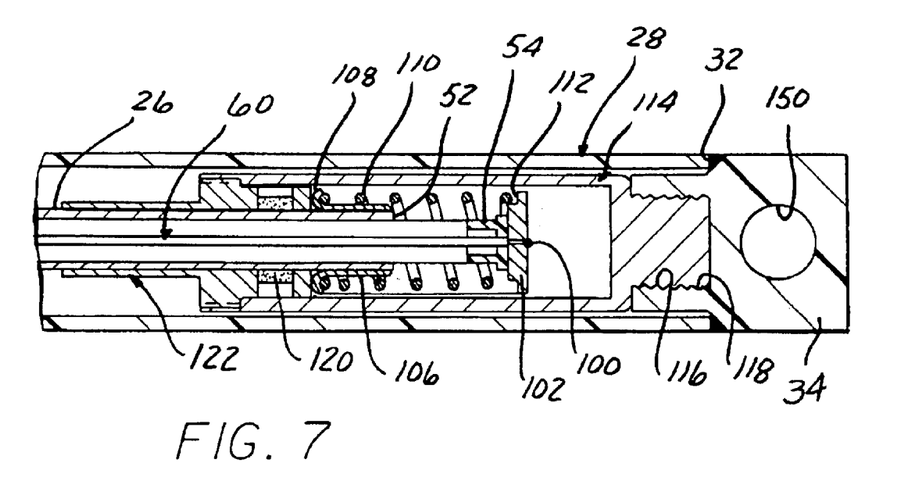
FIG. 7 is a cross-sectional view generally taken along line 7—7 in FIG. 3.

As shown in FIG. 7, the bottom plug assembly 34 is sealingly joined, such as by heat welding, to the second end 32 of the main outer tube 28. A second end 100 of the wave guide or wire 60 is fixedly joined and mounted to a end reflector assembly 102 formed of a nonmagnetic material, such as brass, etc. The end reflector 102 is positionally fixed by a biasing means 110 to a spaced brass or other nonmagnetic material eyelet 106 having an outward rolled over flange 108. The eyelet 106 is press fit or otherwise fixedly mounted on the second end 52 of the inner tube 26 as shown in FIG. 7. The rolled flange 108 supports the biasing means 110, such as a coil spring, which seats between the flange 108 and a recess 112 formed in the end reflector 102. The biasing spring 110 exerts a biasing force on the second end 100 of the wave guide or wire 60 to maintain the wire 60 in a substantially extended, straight position within the inner tube 26 between opposed ends 50 and 52 of the inner tube 26.

An end cap 114 formed of brass or other nonmagnetic material is threadingly coupled by threads on an end extension 116 to mating threads formed in a bore 118 in the end plug 34. The end cap 114 is hollow for substantially its entire length to receive the second end 52 of the inner tube 26, the reflector 102, the eyelet 106, the biasing spring 110, a reference magnet assembly 120 and a brass or other nonmagnetic material fitting tube 122. The fitting tube 122 has a narrowed down end portion which concentrically surrounds and may be disposed in contact with the outer surface of the lower end of the inner tube 26 as shown in FIG. 7. An expanded or enlarged diameter portion of the fitting tube 122 is threadingly joined to the end cap 114 and is fixed thereto by means of an adhesive. In this manner, the end reflector 102, the spring 110 and the reference magnet assembly 120 are held in position adjacent the second end 32 of the main outer tube 28.

Shown pictorially in FIG. 1 is a float 130 which contains a magnet. The weight or specific gravity of the float 130, which is of typical construction for a material level detection application, is selected so that the float 130 rides at the interface or top surface 132 of the material 134 in the tank 12. The magnet inside of the float 130 interacts with the magnetostrictive wire 60 to reflect signals back along the wire 60 to the sensing coil 66 for output to a remotely located controller which determines the level of the top surface 132 of the material 134 in the tank 12 by normal signal time differential calculations.

As shown in generally in FIG. 1, and in greater detail in FIGS. 2, 8A, 8B and 8C, a weight generally denoted by reference number 140 is attached to the lower or distal end of the outer tube structure 22, such as by a removable pin connection to the end plug 34. The weight 140 serves to maintain the flexible outer tube 28 in an elongated, generally planar shape between opposed ends for accurate level detection. The weight 140 also insures that the distal end of the outer tube 28 is located as close as possible to the bottom surface 16 of the tank 12 to minimize the length of the dead zone of non-level measurement.

The weight 140 may take a variety of different constructions. The ideal shape of the weight would be a thin thickness disc of high density material with a large diameter so as to minimize the amount of space consumed by the weight 140 on the bottom surface 16 of the tank 12. However, since level detection apparatus are frequently retrofitted into existing tanks above or below ground, the weight 140 must be sized to fit through the conventional two inch, four inch or slightly larger openings which typically exist in the openings 20 of the tank cover 18.

Figure 2:
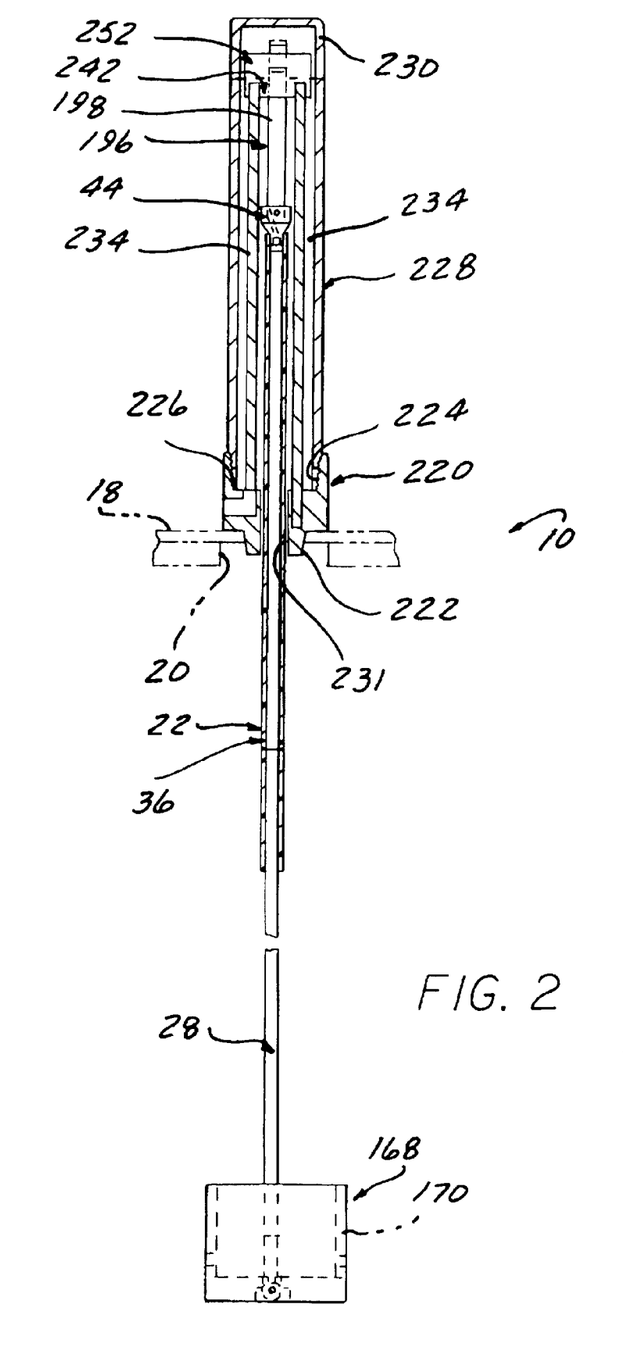
FIG. 2 is a partially cross-sectioned, side elevational view of the level detection apparatus of the present invention shown in FIG. 1.
Figure 8A:
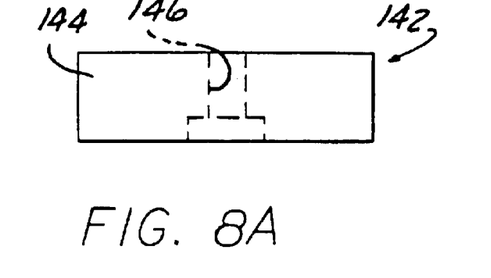
FIGS. 8A, 8B and 8C are all side elevational views of different aspects of a bottom weight according to the present invention.

FIG. 8A depicts a weight 142 formed of a solid disc 144. A counter sunk bore 146 extends generally centrally through the disc 144 to receive the end plug 34 on the outer tube structure 22 as shown in FIG. 2. A transversely extending pin, such as a cotter pin, extends through a bore 150 in the end plug 34 and fits with the countersunk end of the bore 146 to removably affix the weight 142 to the distal end of the outer tube structure 22.

Figure 8B:
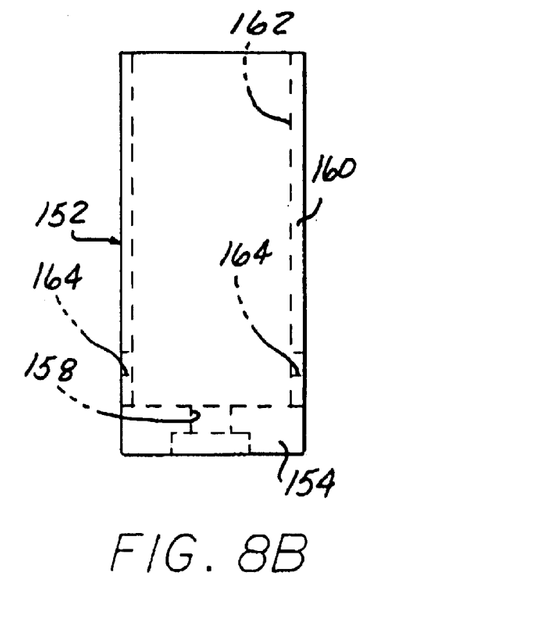

A weight 152 is depicted in FIG. 8B in the form of a unitary structure having a lower disc shaped portion 154 with a counter sunk bore 158. The weight 152 has a long length sidewall 160 defining an elongated inner chamber 162. One or more drain apertures 164 are formed in the sidewall 160 adjacent the lower portion 154 of the weight 152 to allow liquid or material to flow out of the hollow interior chamber 162 when the weight 152 is inserted into the tank 12. A removable pin extends through the aperture 150 in the end plug 34 and seats in the bore 158 to removably attach the end plug 34 to the weight 152.

A weight 168 shown in FIG. 2 is generally similar to the weight 152 shown in FIG. 8B, but has a shorter length sidewall 170.

Figure 8C:
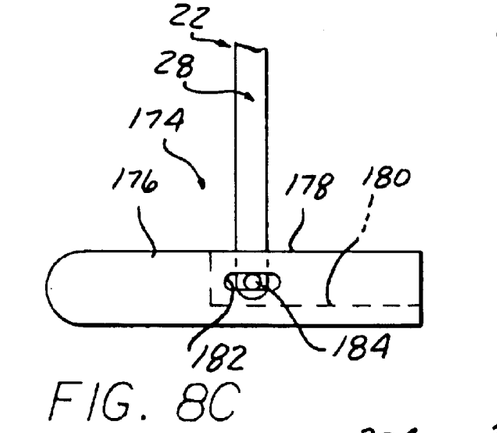

A pivotal weight 174 is shown in FIG. 8C. In this aspect of the invention, the weight 174 is in the form of an elongated, generally cylindrical member having a solid end portion 176 and an opposed end portion 178 having a recess 180 extending from one end to an intermediate portion of the weight 174. A pair of opposed slots 182, only one of which is shown in FIG. 8C, extend through the sidewalls of the weight 174 in communication with the recess 180. The slots 182 slidably receive a cross pin 184 which extends through the slots 182 and the aperture 150 in the end plug 34 to pivotally connect the weight 174 to the distal end of the outer tube 28.

During installation, the weight 174 is pivoted about the pin 184 until the recess 180 surrounds the outer tube structure 22. In this position, the solid end portion 176 of the weight 174 extends downward and is inserted into through the opening 20 in the top cover 18 of the tank 12. When the outer tube structure 22 is almost completely inserted through the height of the tank 12, the solid end portion 176 of the weight 174 will initially contact the bottom surface 16 of the tank 12. Further insertion forces will cause the weight 174 to pivot about the pin 184 until the weight 174 is in a generally horizontal position laying on the bottom surface 16 of the tank 12. This places the outer tube structure 22 in a substantially vertical position within the tank 12.

If necessary, an aperture, not shown, may be provided in the recessed end of the weight 174 to receive a hook to facilitate removal of the weight 174 through the opening 20 in the top cover 18. The hook, once engaged with the aperture, enables the weight 174 to be pivoted back to a generally in-line position with the outer tube structure 22 for easy removal through the opening 20 in the top cover 18.

Referring now to FIGS. 9–14, there is depicted another aspect of the present level detection apparatus 10 in which a biasing force is exerted onto the outer tube structure 22 so as to accommodate any thermal expansion or contraction of the outer tube structure 22 in order to maintain the weight 140 on or as close as possible to the bottom surface 16 of the tank 12. In general, the biasing force is provided by a biasing means, such as a constant force spring mounted in a spring support structure affixable to the top cover 18 of the tank 12 and connected to the outer tube structure 22 through the collar 44.

Figure 10:
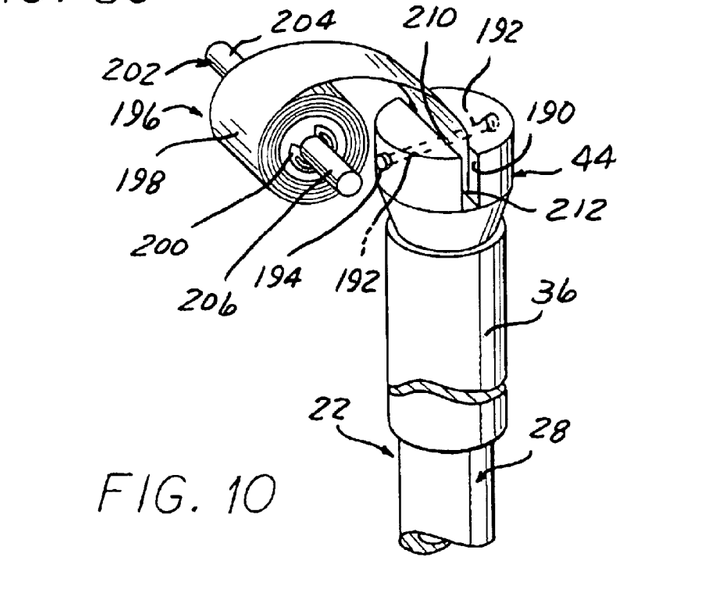
FIG. 10 is a perspective view of the upper portion of the spring and wave guide housing.

As shown in FIG. 10, the collar 44 has a transversely extending, open-ended slot 190 extending therethrough. Aligned transverse bores 192 are formed in the collar 44 and communicate with the slot 190. The bores 192 are sized to receive a connector pin 194.

The biasing means denoted generally by reference number 196 is in the form of a flat constant force spring 198 wound or coiled about a cylindrical drum 200. A spindle 202 extends through the drum 200 and has a pair of arms 204 and 206 which project laterally outward from opposite outer sides of the drum 200. The spring 198 has an aperture 210 adjacent one end 212 for receiving the mounting pin 194 when the end 212 of the spring 198 is disposed in the slot 190 in the collar 44. The pin 194 thus securely affixes the end 212 of the spring 198 to the outer tube structure 22 through the collar 44.

Means are provided for mounting and supporting the biasing means 196 on the top cover of a tank 12, with the biasing means or spring 198 connected to the outer tube structure 22 and extending through the aperture 20 in the top cover 12. The mounting means includes a tank coupling 220 shown in detail in FIG. 9. The tank coupling 220 is in the form of a cylindrical body formed of suitable high strength material, such as stainless steel, which has a threaded end collar 222 for threading engagement with the internal threads in the aperture 20 in the top cover 18 of the tank 12 as shown in FIG. 2. The opposed end of the tank coupling 220 includes a recessed bore having internal threads 224 which are adapted to threadingly receive external threads 226 on an end portion of a hollow outer housing 228. The opposite end of the outer housing 228 also has external threads 229 to threadingly engage mating internal threads on a cap 230 which closes the outer housing 228. The cap 230 can also be integrated with the outer housing 228 as a one piece member by forming the cylindrical housing 228 with one closed end wall.

Figure 9:
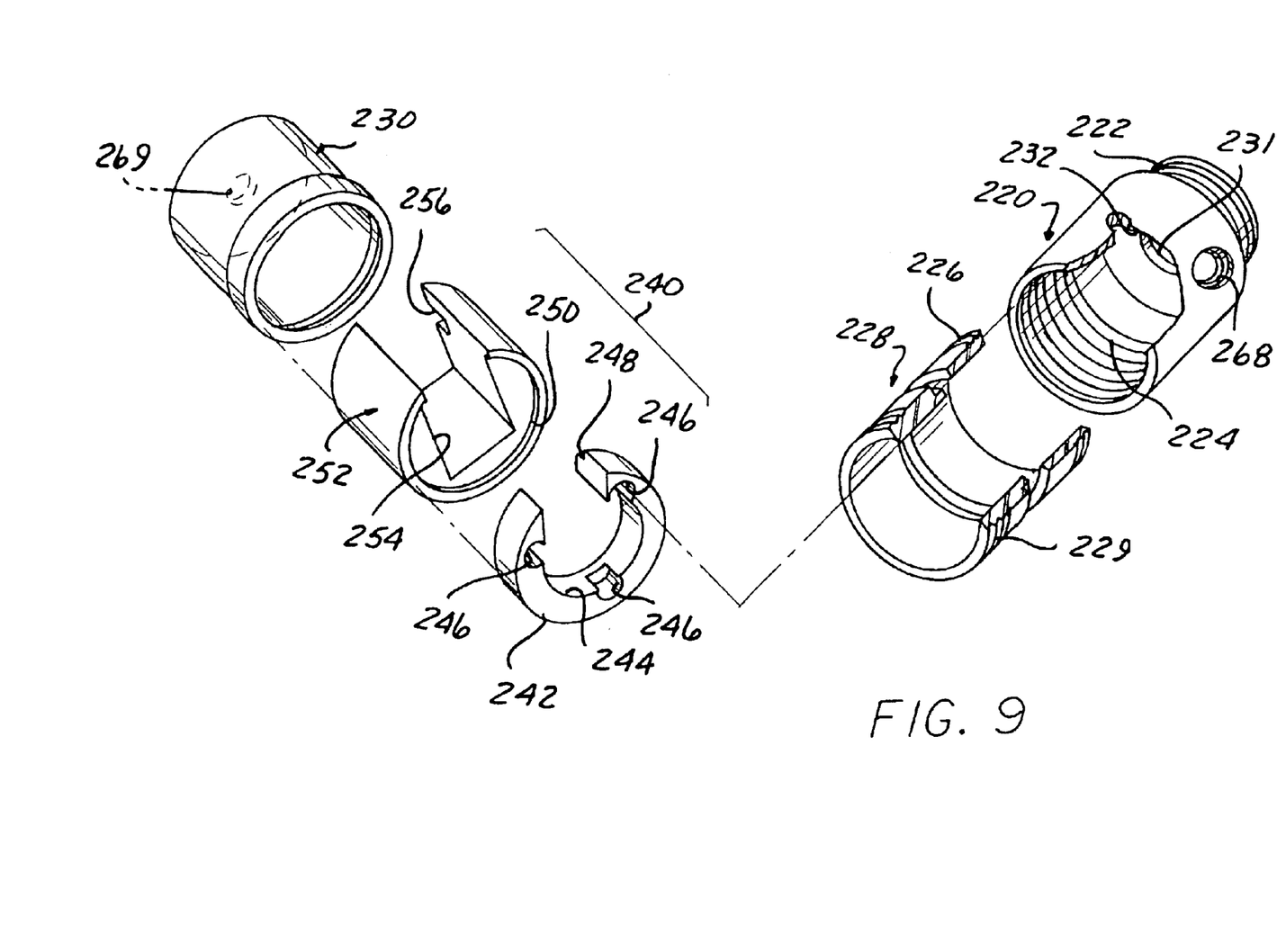
FIG. 9 is an exploded, perspective view of the spring mount and outer housing shown in FIGS. 1 and 2.

The tank coupling 220 includes a generally centrally located through bore 231 through which the outer tube structure 22 is disposed. As shown in FIG. 9, a plurality, such as three by example only, of shallow cylindrical recesses 232 are formed in an internal surface in the tank coupling 220. The recesses 232 are adapted for receiving one end of one of a plurality of support rods, all of which are denoted by reference number 234. The support rods 234 extend outwardly away from the tank coupling 220 for a predetermined height.

Figure 11:
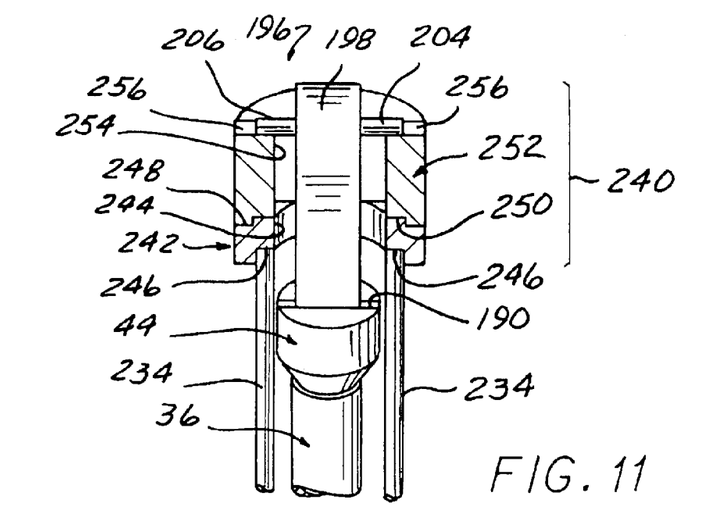
FIG. 11 is a partially cross-sectioned, side elevational view of the spring and spring mount according to the present invention.
Figure 13:
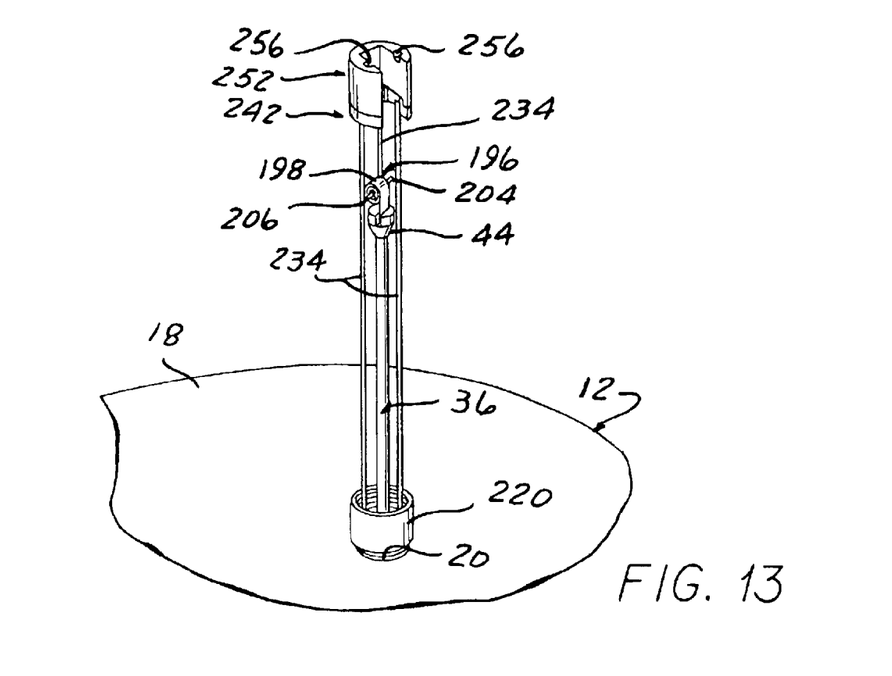
FIG. 13 is a pictorial representation of an intermediate step in the installation method of the level detection apparatus according to the present invention.

As shown in FIGS. 9, 11 and 13, a spring support 240 is mounted on the support rods 234 and is adapted for supporting the biasing means 196. The spring support 240 includes a two-part structure formed of a first mounting ring 242 having a generally C-shape with a large central aperture 244. A plurality of semicircular recesses 246 are formed in a sidewall and extending partially through the length of the mounting ring 242 and open to the central aperture 244. Each recess 246 is adapted for receiving an opposed end of one of the support rods 234 as shown in FIG. 13. The mounting ring 244 is also formed with a stepped end 248 which mates with a complimentary recessed end 250 in a support ring 252. The support ring 252 also has a generally C-shape configuration with an internal through bore 254 adapted for receiving the spring 198 therethrough. One end of the support ring 252 includes a pair of opposed notches 256 which open to the bore 254. The notches 256 receive one of the arms 202 and 204 extending outward from the drum 200 and support the coil portion of the biasing spring 198 at the upper end of the support rods 234. The support ring 252 is rotatable relative to the mounting ring 242 to allow the spring 198 to be disposed in any orientation after installation of the tube structure in the tank 12.

Figure 12:
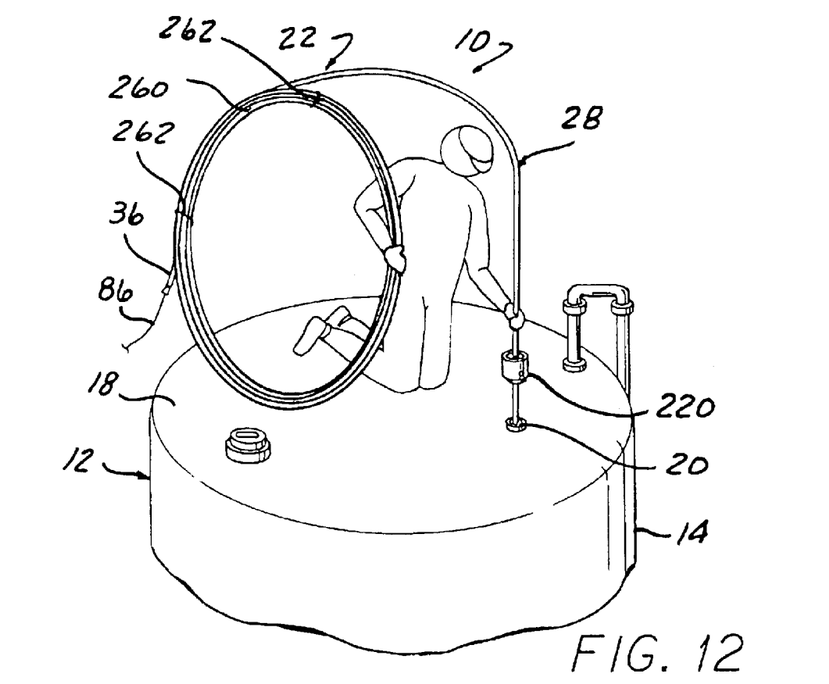
FIG. 12 is a pictorial representation of an initial step in installing the level detection apparatus of the present invention in a tank.
Figure 14:
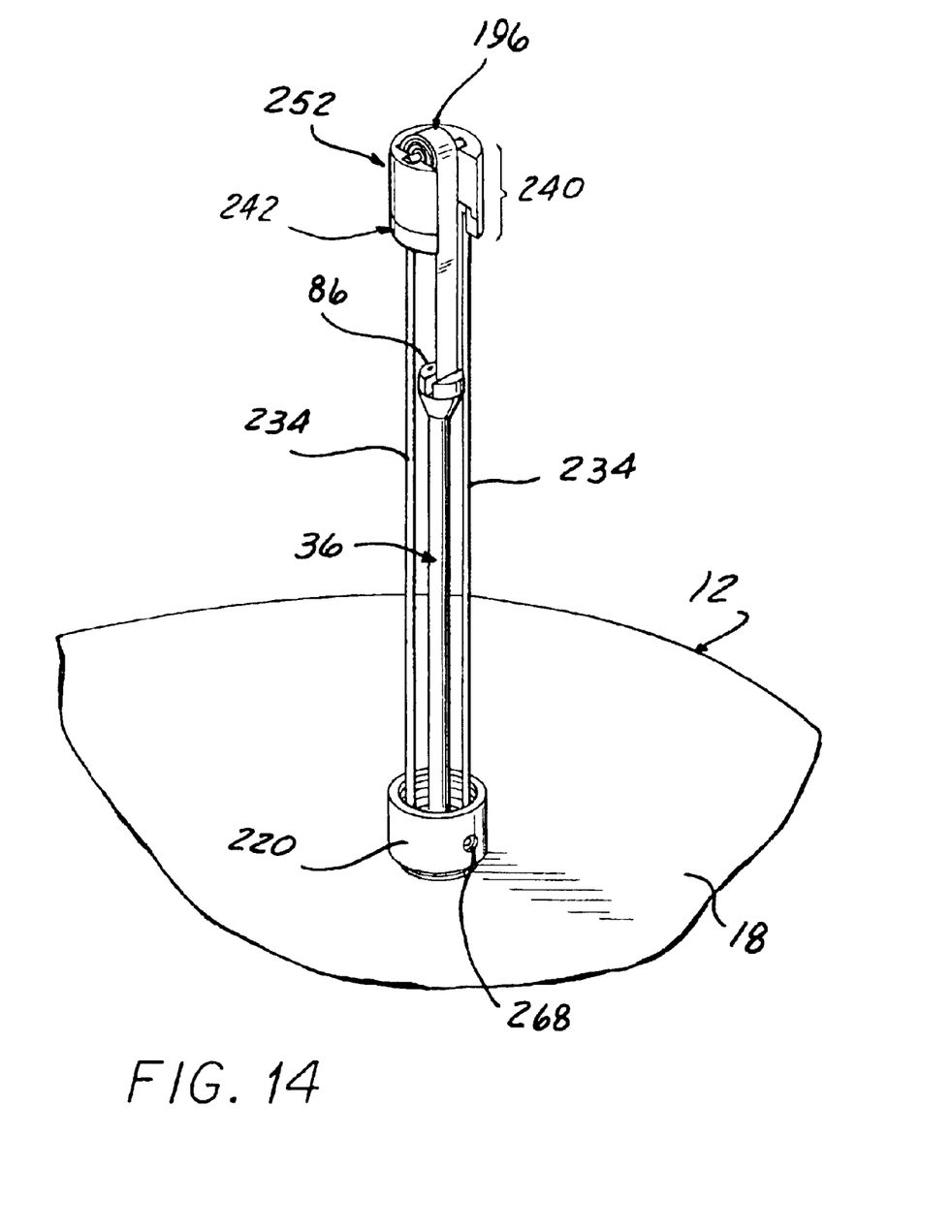
FIG. 14 is a pictorial representation, similar to FIG. 13, but showing a subsequent step in mounting the spring to the spring mount according to the present invention.

Referring now to FIGS. 12–14, installation of the level detection apparatus 10 in a tank 12 will now be described.

As shown in FIG. 12, initially the outer tube structure 22 is wound in a large diameter coil 260. The coil 260 may be tied by suitable tie wraps or cords 262 for ease of handling, transport to the top of the tank 12, etc.

The installer initially inserts the distal end of the outer tube structure 22 through the tank coupling 220, then through float(s) 130, and connects the distal end of the outer tube structure 22 to the weight 140 as described above. The weight 140, float(s) 130 and the distal end of the outer tube structure are then inserted through the aperture 20 in the top cover 18 of the tank 12 as shown in FIG. 12. The insertion process is continued until the weight 140 rests on the bottom surface 16 of the tank 12.

It should be noted that the tank coupling 220, after insertion over the outer tube structure 22 and after the weight 140 is attached to the outer tube structure 22, may be threaded into the aperture 20 in the cover 18 as shown in FIG. 13.

With the relatively non-rigid upper tube portion 36 extending outward from the tank coupling 220, the installer inserts the support rods 234 into the recesses 232 in the tank coupling 220. Next, the opposite ends of the support rods 234 are mounted in the recesses in the mounting ring 242. The support ring 252 is then rotatably coupled to the mounting ring 242 as shown in FIG. 13. With the upper outer tube 36 firmly held in a fixed position relative to the top cover 18 of the tank 12, the installer extends the biasing spring 198 until the arms 204 and 206 on the spring coil are seated in the recesses 256 in the mounting ring 254 as seen in FIG. 14. This mounts the coiled end of the biasing spring 198 in a fixed position relative to the top cover 18 to enable the spring 198 to exert a constant force on the outer tube structure 22 to accommodate any thermal expansion or contraction.

It should be noted that the initial installation of the apparatus 10 requires that the weight 140 be inserted into the tank 12 and disposed at a predetermined position above the tank bottom 12 to accommodate a maximum amount of expected thermal expansion of the outer tube structure 22.

The outer housing 228 is then mounted over the mounting ring 242, the support ring 252, the support rods 234 and threaded into the tank coupling 220. The end cap 230 is then threaded to the outer end of the outer housing 228 to complete the installation process.

Referring briefly back to FIGS. 3 and 4, the multiconductor cable 86 exits from the interior of the outer tube structure 22 through a bore 266 in the collar 44. The outer end of the bore 266 is offset as clearly shown in FIG. 14 to permit the multiconductor cable 86 to easily pass exteriorly of the collar 44.

As shown in FIGS. 9 and 14, the tank coupling 222 is provided with a laterally extending bore 268 which allows passage of the multiconductor cable 86 exteriorly of the tank coupling 220 for external connection.

The end cap 230 may also be provided with a longitudinally extending bore 269, see FIG. 9, to allow the cable to extend straight through the outer housing 228. This arrangement is useful when a remote transmitter is mounted on the outer housing 228.

Instead of a magnetostrictive wire based sensor, the present invention is also adaptable for use with one or more discrete sensors, such as reed switches, mounted at spaced locations along a flexible housing. The sensors can also be temperature and/or pressure sensors.

In some wave guide applications, the wave guide is disposed in direct contact with the enclosure content without an inner or outer tube. The biasing means and the weight of the present invention as still usable with such a wave guide to accommodate thermal expansion and contraction of the wave guide.

In summary, there has been disclosed a unique level detection apparatus having a flexible outer housing permitting coiling of the housing for ease of transportation to and installation in a tank or reservoir. The apparatus includes a unique biasing means which exerts a constant biasing force on the tube assembly to accommodate any thermal expansion and contraction of the outer tube assembly during use which enables the weight attached to the distal end of the outer tube assembly to be maintained in contact with or in close proximity to the bottom of the tank to maximize the level detection range within the tank by minimizing any dead zone or non-measurement distance above the bottom of the tank.

What is claimed is:

1. A level detection apparatus for material in an enclosure having a bottom comprising:
   wave guide means having first and second opposed ends;
   biasing means coupled to the first end of the wave guide means for exerting a biasing force on the wave guide means to accommodate thermal expansion and contraction of the wave guide means;
   means adapted for fixedly mounting the biasing means to the enclosure; and
   a weight coupled to the second end of the wave guide means for stationarily fixing the second end of the wave guide means relative to the bottom of the enclosure.

2. The apparatus of claim 1 wherein the biasing means comprises:
   a constant force spring having an end extending from a coil, the end attached to the wave guide means.

3. The apparatus of claim 1 wherein the wave guide means comprises:
   a magnetostrictive wire extending through an inner housing; and
   transducer means for imparting a signal to the magnetostrictive wire and for receiving a return signal along a magnetostrictive wire.

4. The apparatus of claim 1 wherein the weight comprises:
   a hollow member having a closed end and an interior chamber; and
   means for connecting the weight to the second end of the wave guide means.

5. The apparatus of claim 1 wherein:
the weight comprises a solid member having a through bore; and
a mounting pin mountable in the bore for connecting the weight to the second end of the wave guide means.

6. The apparatus of claim 1 wherein the weight comprises:
a body pivotally attached to the second end of the wave guide means, the body pivotal during insertion into the enclosure between a first position generally aligned with the wave guide means and a deployed position angularly disposed with respect to the wave guide means.

7. The apparatus of claim 1 wherein the fixedly mounting means further comprises:
a coupling mountable on an enclosure cover and having a through bore for receiving an outer tube therethrough, the outer tube surrounding the wave guide means;
a plurality of support rods mounted in the coupling and extending outward from the coupling; and
mounting means for receiving opposite ends of the support rods, the mounting means carrying a coil portion of the biasing means.

8. The apparatus of claim 7 wherein the mounting means comprises:
first and second bodies rotatably coupled to each other, the first body receiving one end of the support rods and the second body supporting the biasing means.

9. The apparatus of claim 7 wherein the fixedly mounting means further comprises:
the coupling having a first end mountable through an aperture in an enclosure;
a first through bore in the coupling receiving the outer housing therethrough; and
the coupling including means for supporting one end of the support rods.

10. The apparatus of claim 9 wherein the fixedly mounting means further comprises:
a cover housing having first and second ends, the first end coupled to the body and surrounding the support rods.

11. The apparatus of claim 10 further comprising:
a cap removably mountable over the second end of the cover housing.

12. The apparatus of claim 1 wherein the fixedly mounting means further comprises:
a coupling having a first end adapted to be mountable through an aperture in an enclosure; and
a first through bore extending through the coupling receiving the wave guide means therethrough.

13. The apparatus of claim 12 further comprising:
a cover housing having first and second ends, the first end attachable to the coupling and surrounding the fixedly mounting means.

14. The apparatus of claim 13 further comprising:
a cap removably mountable over the second end of the cover housing.

15. The apparatus of claim 12 further comprising:
conductors extending from the outer housing;
a conductor bore formed in the coupling for passing the conductors through the coupling.

16. The apparatus of claim 15 wherein the conductor bore is formed in a sidewall of the coupling and opens externally of the coupling.

17. The apparatus of claim 15 wherein:
the conductor bore opens within the coupling.

18. The apparatus of claim 1 wherein the wave guide means comprises:
a wave guide having first and second opposed ends;
transducer means, coupled to the first end of the wave guide means, for transmitting signals on the wave guide means and for receiving response signals from the wave guide means useful in determining the surface level of material through which the wave guide means extends;
an inner housing having first and second ends, the second end of the wave guide fixed to the second end of the inner housing;
an outer flexible housing surrounding an inner housing and having first and second ends, the second end of the inner housing fixed to the second end of the outer housing, the biasing means coupled to the first end of the outer housing; and,
the weight attached to the second end of the outer housing.

19. A level detection apparatus for material in an enclosure having a bottom comprising:
a wave guide mounted in an inner housing having first and second opposed ends;
transducer means, coupled to one end of the wave guide, for transmitting signals on the wave guide and for receiving response signals from the wave guide useful in determining the surface level of material through which the wave guide extends;
an outer flexible housing having first and second ends;
the second end of the inner housing fixed to the outer housing;
biasing means coupled to the first end of the outer housing for exerting a constant biasing force on the outer housing to accommodate thermal expansion movement of the outer housing;
means for fixedly mounting the biasing means, the fixedly mounting means further comprising:
a coupling mountable on an enclosure cover and having a through bore for receiving the outer tube therethrough;
a plurality of support rods mounted in the coupling and extending outward from the coupling, and mounting means for receiving opposite ends of the support rods, the mounting means carrying a coil portion of the biasing means; and a weight coupled to the second end of the outer tube for stationarily fixing the second end of the outer housing to a bottom of an enclosure.

20. The apparatus of claim 19 wherein:
first and second bodies are rotatably coupled to each other, the first body receiving one end of the support rods and the second body supporting the biasing means.

21. The apparatus of claim 19 wherein the wave guide comprises:
a magnetostrictive wire extending through the inner housing; and
the transducer means including means for imparting a signal to the magnetostrictive wire and for receiving a return signal along a magnetostrictive wire.

22. The apparatus of claim 19 wherein the weight further comprises:
a through bore extending through the weight for receiving the second end of the outer housing therethrough; and
a mounting pin mountable in the bore in the weight and through the second end of the outer housing for coupling the weight and the outer housing.

23. The apparatus of claim 19 wherein:

a cover housing having first and second ends, the first end attachable to the coupling and surrounding the fixedly mounting means.

24. The apparatus of claim 19 wherein:

conductors extending from the outer housing;

a conductor bore formed in the coupling for passing the conductors through the coupling.

25. A level detection apparatus for material in an enclosure having a bottom comprising:

a wave guide mounted in an inner housing having first and second opposed ends, the wave guide including:
- a magnetostrictive wire extending through the inner housing; and
- transducer means, coupled to one end of the wave guide, for transmitting signals on the wave guide and for receiving response signals from the wave guide useful in determining the surface level of material through which the wave guide extends;

an outer flexible housing having first and second ends;

the second end of the inner housing fixed to the outer housing;

biasing means coupled to the first end of the outer housing for exerting a constant biasing force on the outer housing to accommodate thermal expansion movement of the outer housing;

means for fixedly mounting the biasing means, the fixedly mounting means:
- a coupling mountable on an enclosure cover and having a through bore for receiving the outer tube therethrough;
- a plurality of support rods mounted in the coupling and extending outward from the coupling;
- mounting means for receiving opposite ends of the support rods, the mounting means carrying a coil portion of the biasing means; and
- a weight coupled to the second end of the outer tube for stationarily fixing the second end of the outer housing to a bottom of the enclosure, the weight including:
  - a through bore extending through the weight for receiving the second end of the outer housing therethrough; and
  - a mounting pin mountable in the bore in the weight and through the second end of the outer housing for coupling the weight and the outer housing.

26. The apparatus of claim 25 wherein the mounting means comprises:

first and second bodies rotatably coupled to each other, the first body receiving one end of the support rods and the second body supporting the biasing means.

27. The apparatus of claim 25 wherein the biasing means comprises:

a constant force spring having an end extending from a coil, the end attached to the outer housing.

28. The apparatus of claim 25 wherein the weight comprises:

a hollow member having a closed end and an interior chamber.

29. The apparatus of claim 25 wherein the weight comprises:

the weight comprises a solid member having a through bore.

30. The apparatus of claim 25 wherein the weight comprises:

a body pivotally attached to the second end of the outer housing, the body pivotal during insertion in to a tank between a first position generally aligned with the outer housing and a deployed position angularly disposed with respect to the outer tube.

31. The apparatus of claim 25 wherein the fixedly mounting means further comprises:

the coupling having a first end mountable through an aperture in an enclosure;

a first through bore in the coupling receiving the outer housing therethrough; and the coupling including means for supporting one end of the support rods.

32. The apparatus of claim 25 wherein the fixedly mounting means further comprises:

a cover housing having first and second ends, the first end coupled to the body and surrounding the support rods.

33. The apparatus of claim 25 further comprising:

a cap removably mountable over the second end of the cover housing.

34. The apparatus of claim 25 further comprising:

conductors extending from the outer housing;

a conductor bore formed in the coupling for passing the conductors through the coupling.

35. The apparatus of claim 34 wherein the conductor bore is formed in a sidewall of the coupling and opens externally of the coupling.

36. The apparatus of claim 34 wherein:

the conductor bore opens within the coupling.

37. A level detection apparatus for material in an enclosure having a bottom comprising:

sensor means having first and second opposed ends;

biasing means coupled to the first end of the sensor means for exerting a biasing force on the sensor means to accommodate thermal expansion and contraction of the sensor means;

means adapted for fixedly mounting the biasing means on the enclosure; and a weight coupled to the second end of the sensor means for stationarily fixing the second end of the sensor means relative to the bottom of the enclosure.

38. The apparatus of claim 37 wherein the biasing means comprises:

a constant force spring having an end extending from a coil, the end attached to the sensor means.

* * * * *